Nov. 11, 1958   G. B. DOREY   2,859,707
HOPPER DISCHARGE OUTLET FOR RAILWAY CARS
Filed March 26, 1952   6 Sheets-Sheet 1
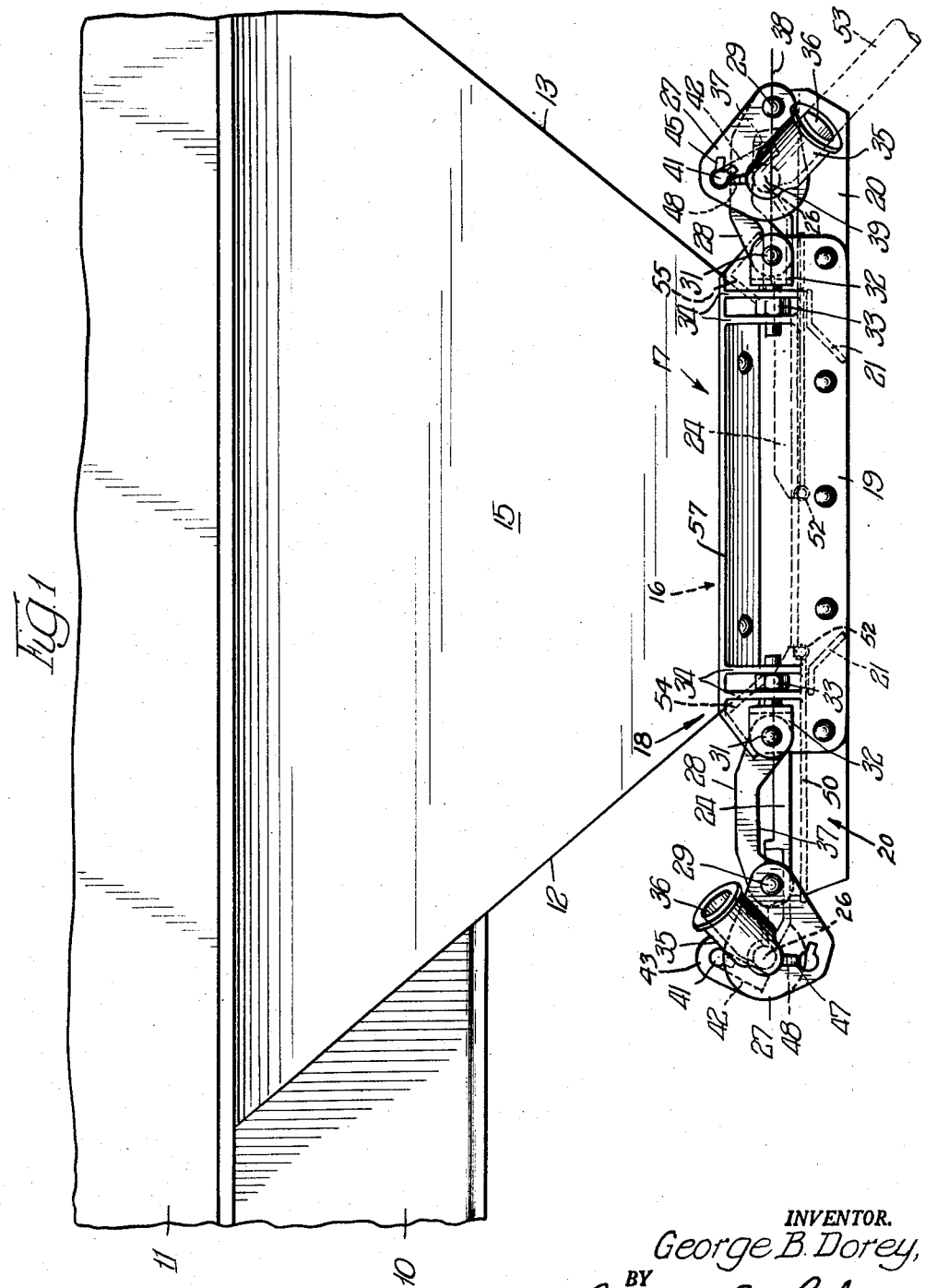
INVENTOR.
George B. Dorey,
BY
Robert R. Lockwood
atty

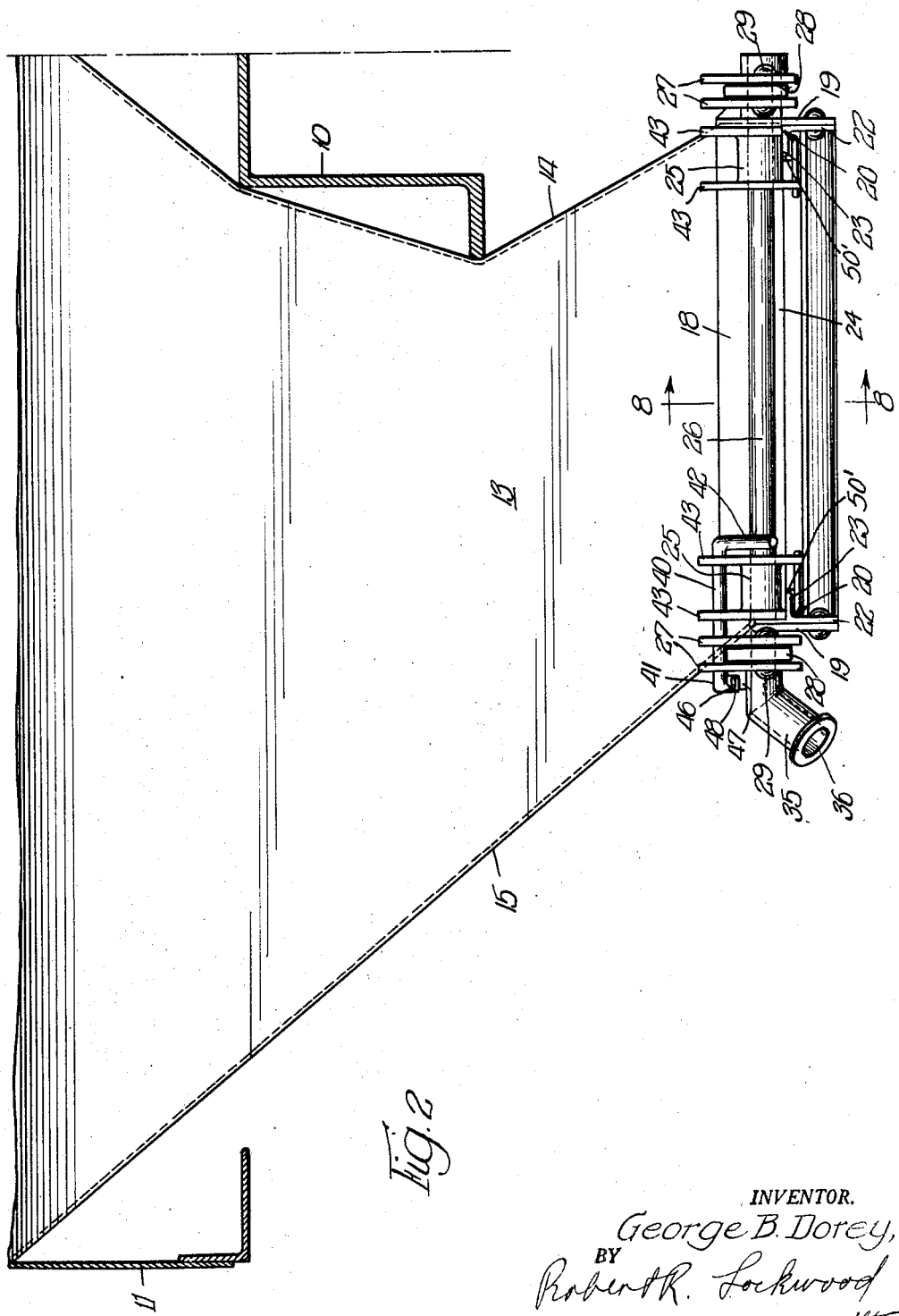

Nov. 11, 1958 G. B. DOREY 2,859,707
HOPPER DISCHARGE OUTLET FOR RAILWAY CARS
Filed March 26, 1952 6 Sheets-Sheet 3
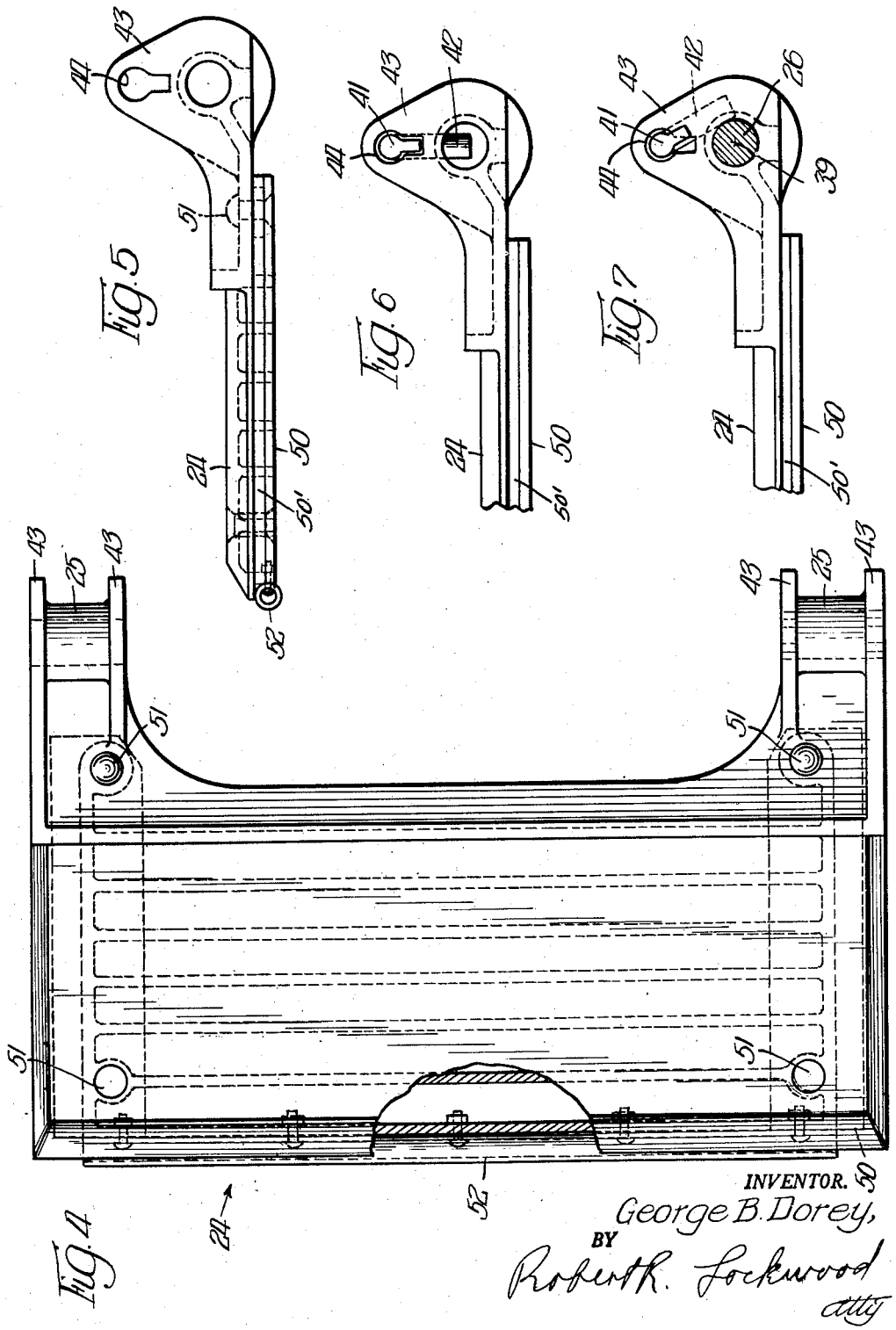
INVENTOR.
George B. Dorey,
BY
Robert R. Lockwood
ATTY

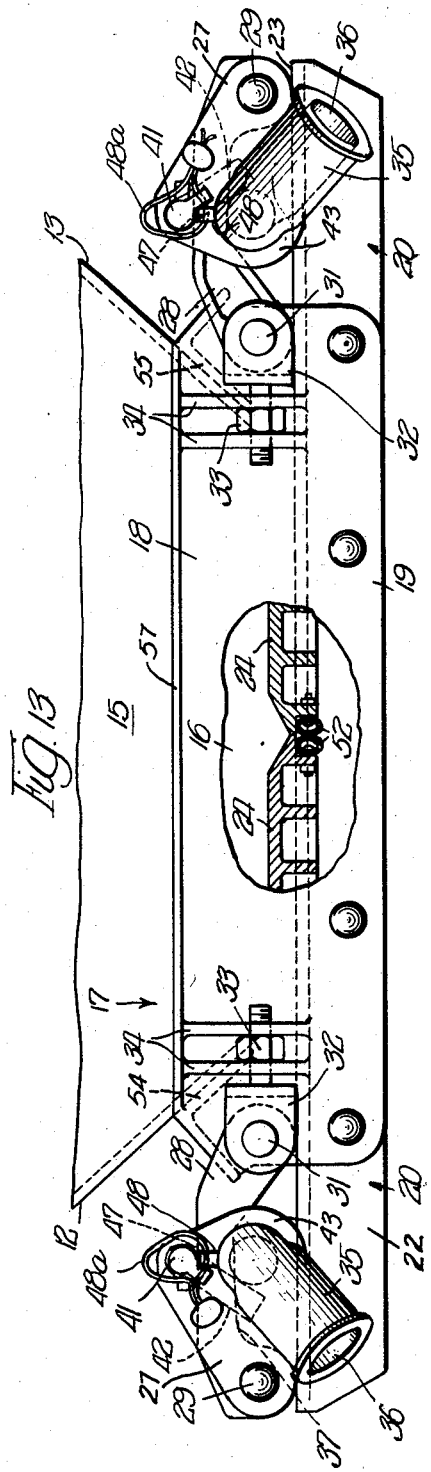
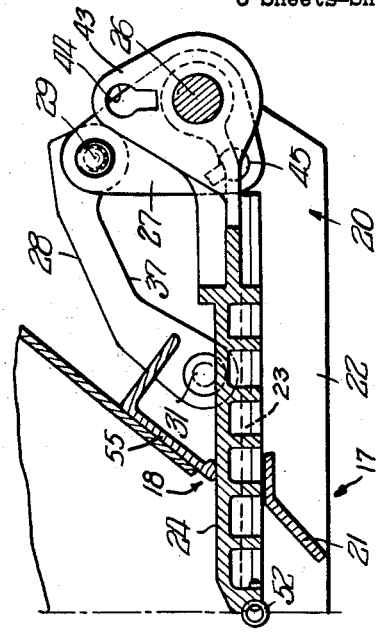
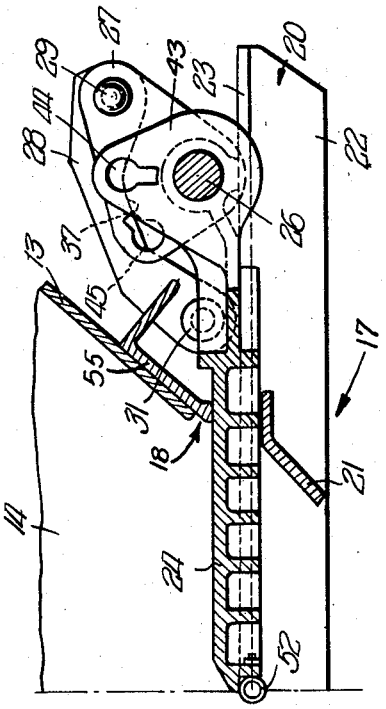
INVENTOR.
George B Dorey,
BY
Robert R. Lockwood
Atty.

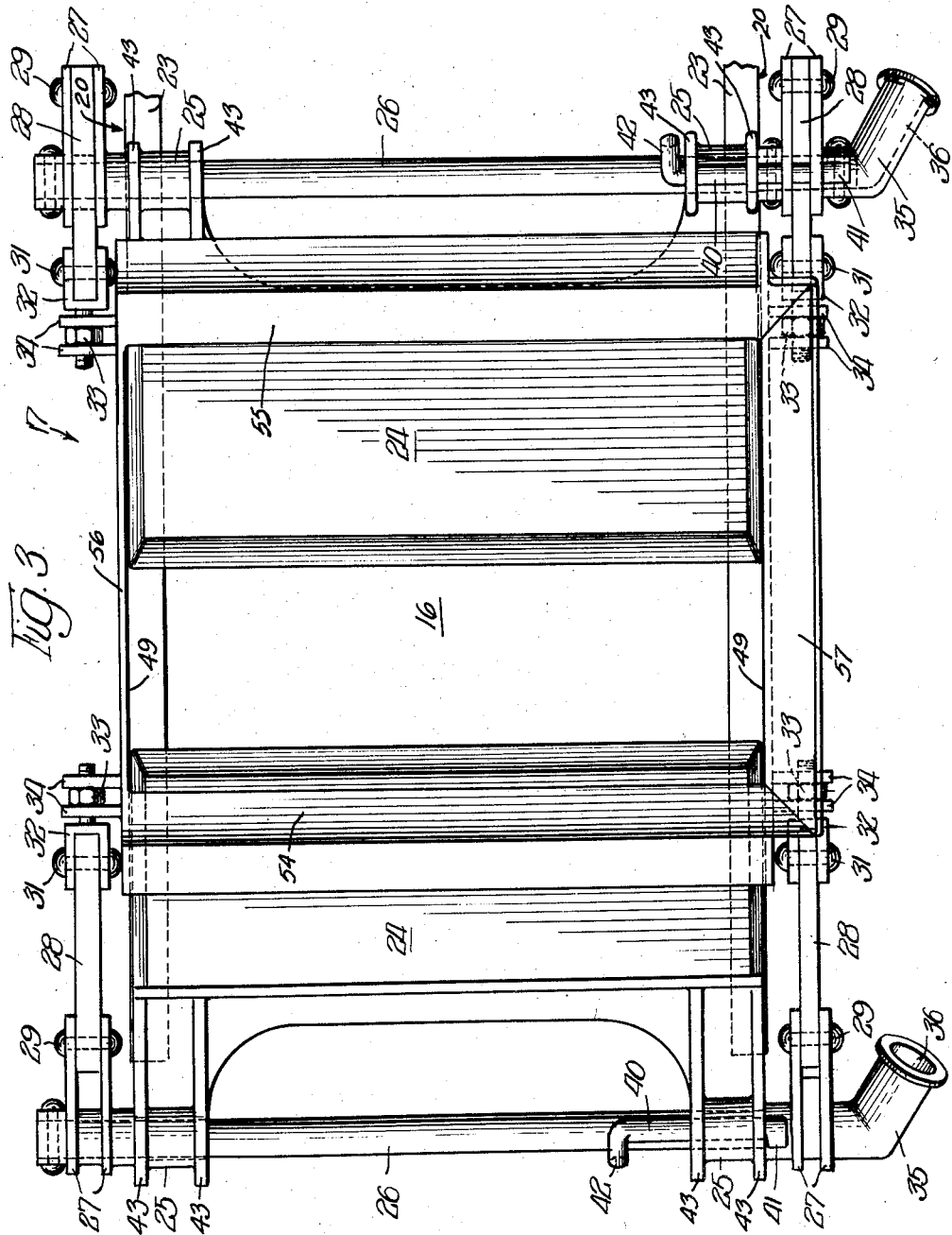

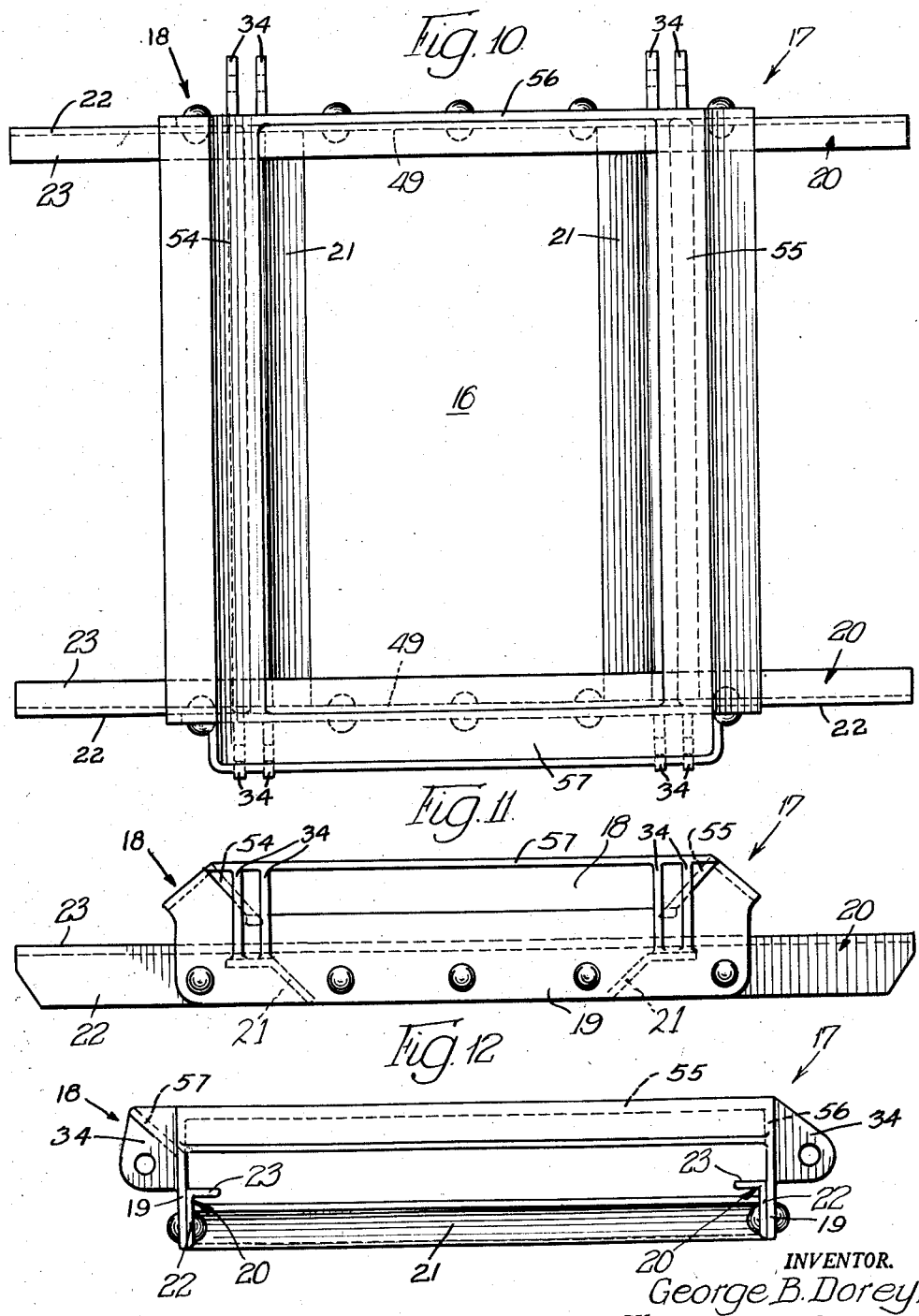

United States Patent Office 2,859,707
Patented Nov. 11, 1958

2,859,707

HOPPER DISCHARGE OUTLET FOR RAILWAY CARS

George B. Dorey, Westmount, Quebec, Canada, assignor to Enterprise Railway Equipment Company, Chicago, Ill., a corporation of Illinois Application March 26, 1952, Serial No. 278,605

7 Claims. (Cl. 105—253)

The invention relates to a discharge outlet for a load containing hopper and is of a type employing sliding gates for closing the hopper opening.

One of the objects of the invention is to provide a structure wherein a single opening is closed by a pair of gates which operate independently of each other instead of utilizing a large single gate as is now established practise and the present improvements contemplate toggle acting mechanism to provide greatly multiplied power for initiating release of the gates and also for forcing the gates to tightly closed position.

Other objects of the invention are to provide mechanism insuring uniform translatory movement of the respective sides of the gates and to make provision for adjustment in the position of the toggle mechanism mounting to insure tightly fitting relation between the meeting edges of a pair of sliding gates.

A still further object of the invention is to provide a longitudinally movable and rotatable key-shaped sealing bolt structure which is mounted to have limited longitudinal movement coaxially with a shaft and having means compelling insertion of the bolt prior to assembly of the shaft in its bearings.

Still further objects of the invention are: To provide a rectangular frame around the hopper opening with another lower frame secured thereto and providing a discharge chute; to mount rail members on depending side walls of the frame for forming a part of the lower frame and slidably mounting a gate or gates; and to form the chute in part by inwardly sloping transverse walls interconnecting the rail members.

The invention further resides in certain details of construction as will be pointed out hereinafter.

The improvement is shown in the drawings as applied to a hopper car having discharge outlets for directing lading to a location between the rails.

In said drawings Figure 1 is a vertical side elevational view of a portion of a hopper showing the improved discharge outlet with one of a pair of gates in closed position and showing the other gate of the pair in fully opened position.

Figure 2 is a vertical end elevational view of the structure shown in Figure 1 as viewed from right to left.

Figure 3 is a plan view of the structure shown in Figure 1 with certain parts of the hopper flooring removed to better illustrate the construction.

Figure 4 is a detached plan view of the gate, with a portion broken away to show certain details of construction.

Figure 5 is a side elevational view of the gate shown in Figure 4.

Figure 6 is a fractional end elevational view of the end of the gate showing the position of the sealing bolt during its insertion prior to the application of the shaft in the bearing of the gate.

Figure 7 is a view similar to Figure 6 with the shaft positioned in the bearing and illustrating the limitation in rotatable movement of the sealing bolt due to the presence of the shaft.

Figure 8 is a vertical sectional view taken through the gate and frame at a location corresponding generally to line 8—8 of Figure 2 and showing the position of the parts with the gate in slightly open position.

Figure 9 is a view similar to Figure 8 except that the opening movement of the gate is advanced beyond that shown in said Figure 8.

Figure 10 is a detached plan view of the frame with the runways in assembled relation.

Figure 11 is a side elevational view of the frame assembly shown in Figure 10.

Figure 12 is an end elevational view of the outlet assembly shown in Figure 10.

Figure 13 is a side elevational view of the outlet assembly with the pair of gates in toggle locked position and a section of the structure broken away to illustrate the sealing relation between the gtaes at their meeting edges.

In said drawings 10 indicates the center sill of the car and 11 one of the side walls spaced outwardly from the center sill. Positioned intermediate the center sill 10 and side wall 11 is a four-sided hopper formed in part by oppositely sloping walls 12 and 13 which meet with inner and outer side walls indicated at 14 and 15 respectively, said respective walls 12, 13, 14 and 15 leading to a four-sided discharge opening 16. Bordering the opening 16 is a frame structure 17 which includes an upper section 18 overlying the walls of the hopper and secured thereto and extending downwardly therefrom are side walls 19—19.

Secured to the side walls 19—19 is a sub-hopper including longitudinally extending rail members 20 connected by transversely extending walls 21—21 which are spaced lengthwise from each other to form in combination with the rail members 20—20 a four-sided chutelike receptacle. The rail members 20 are preferably of angle shape with one flange 22 secured to the depending walls 19 of the chute and having the adjacent flange 23 extending inwardly laterally to form uninterrupted supports for sliding gates 24—24 to prevent leakage of lading.

The sliding gates 24—24 are arranged to slide in opposite direction and meet, as shown in Figure 13, adjacent the center of the discharge opening 16. The rail members 20 project beyond the frame 17 proper to form cantilevers for supporting the gates 24 in open position. The gates 24 are each provided with a toggle mechanism for moving them and retaining the same in closed position. Inasmuch as the mechanism and associated parts for each gate are of identical construction, the description herein will be confined to only one of the gates and its related mechanism.

Each gate 24 is provided at its outer end with bearings 25—25, Figure 3, which lie above the flanges 23 of the rail members 20. As shown in Figure 4, the bearings 25 are formed integrally with and disposed between flanges 43 that are located at the sides of and formed integrally with the respective gate 24. Journalled in these bearings 25 is an operating shaft 26 which projects outwardly to each side of the frame structure 17 and is there fitted with fixedly mounted pairs of toggle arms 27—27. Links 28 are pivoted at one end at 29 to and between the respective pairs of toggle arms 27 and pivotally mounted at their opposite ends to the frame structure 17 at 31 through the medium of longitudinally adjustable threaded eyebolts 32. Each threaded eyebolt 32 is retained against longitudinal movement by means of a complementary threaded nut 33 held between a pair of spaced lugs 34—34 which in turn are formed integrally with the frame structure 17. Fixedly mounted on the outer end of the shaft 26 is an operating handle 35 having a hollow socket 36 to accommodate a removable operating tool which extends outwardly from the frame 17 at an obtuse angle to the shaft 26. The link 28 includes an indented portion 37 which straddles the shaft 26 when the toggle mechanism is in an overcenter locked position as seen in Figure 1 with the associated gate 24 closed thereby allowing the line of thrust which joins the axes of pivots 29 and 31 to extend along a line 38 Figure 1 which lies slightly below and to one side of the axis 39 of the shaft 26.

The toggle mechanism is arranged to be retained in its overcenter locked relation by means of a sealing bolt 40 having at one end a key shaped end 41 and at the opposite end an outstanding handle 42. The bolt 40 extends through flanges 43—43 formed at the outer edges of one of the bearings 25 on the gate 24. It will be noted that the flanges 43 are each formed with a key shaped aperture 44 corresponding substantially in shape to the key shaped end 41 of the sealing bolt 40. The apertures 44 are so disposed and located as to compel insertion of the sealing bolt 40 before insertion of the shaft 26 in its bearings and to this end the apertures 44 are positioned to extend radially with respect to the axis 39 of the shaft 26 as seen in Figure 6. After assembly of the sealing bolt 40 in the flanges 43 and the insertion of the shaft 26 in the bearings 25 carried by each gate 24 the gate assembly is applied to the frame structure 17. Upon insertion of the shaft 26 in its bearings 25 the sealing bolt 40 is given a partial rotation as shown in Figure 7 to allow the handle 42 to rest on the shaft 26. The key shaped end 41 of the bolt is then out of registering alignment with the apertures 44 and cannot be accidentally lost or removed without dismantling the shaft and gate assembly. The toggle arms 27 are provided with key shaped apertures 45 for the accommodation of the key shaped end 41 of the sealing bolt 40 therethrough and above the toggle link 28 as shown in Figures 1 and 2 thereby retaining the toggle mechanism in closed position. The key shaped end 41 of the bolt 40 is provided with an aperture 46 and in alignment therewith when the bolt is fully thrown, there is an aperture 47 formed in a wall 48 of the handle 35. The said apertures 46 and 47 when in registering alignment accommodate a sealing ribbon 48a. Figure 13 shows the bolts 40 overlying the toggle links 28 and thereby preventing any movement thereof or rotation of the respective shaft 26 if an attempt is made to rotate the handle 35.

The gate 24 in its sliding movement is guided sideways between the inner faces 49—49 of the frame side walls 19—19 of the frame 17. The gate 24 is further guided against vertical displacement by means of guiding plates 50, Figures 4 and 5, which are spaced from the main body of the gate on its underside to form a groove 50', the plates 50 being riveted to the gate 24 by rivets 51. As shown in Figure 2, the grooves 50' on opposite sides of the gate 24 receive the horizontal flange 23 of the rail members 20 and thus the gates 24 are guided therealong and prevented from being displaced upwardly.

A resilient gasket 52, Figure 13, is disposed along the forward edge of each gate 24 for the purpose of sealing the closure against leakage at their meeting edges. As shown in Figure 4, each resilient gasket 52 in the uncompressed condition, for example with one or both gates 24 in partly open position, projects beyond the edge of the respective gate which meets, as shown in Figure 13, with the corresponding edge of the other gate 24. While the juxtaposed edges of the gates 24 may not be in contact engagement throughout the entire extent, the resilient gaskets 52 therebelow provide an adequate seal against leakage of lading therepast.

It has heretofore been customary in structures involving a sliding gate for closing an opening to provide a one piece closure. A gate of this character presenting an extended area is difficult to move with heavily compacted lading such as cement, lime, activated earth and similar materials. This invention contemplates solution of the difficulties by forming the gates in two sections and further providing for greatly multiplied mechanical advantage at the initial movement of the gate in an opening direction. The mechanical advantage referred to is obtained through the medium of the toggle acting mechanism comprising the toggle arms 27 and links 28 at each end of each shaft 26 which operates at maximum efficiency to apply maximum force with minimum movement at the initiation of the opening movement of the gate and again at the termination of the gate closing movement.

The operation of the device and the advantages of the improved structure may be best realized by following out the sequence of operations involved in a gate opening and closing operation as follows: assuming the gate 24 is in closed position as seen in Figure 1, the operator after moving the sealing bolt 40 to retracted position inserts a bar 53 in the handle 35 as indicated by conventional dot and dash lines. Upon rotation of the shaft 26 in a counterclockwise direction the toggle joint is opened and the shaft and door are moved outwardly. The extent of mechanical advantage derived from the initial rotary movement of the shaft 26 may be realized by reference to Figure 8 wherein the shaft rotation through an angular distance of 45 degrees operates to move the gate a distance of only one inch. Rotation of the shaft 26 in the indicated direction is continued until the toggle mechanism is moved through the position in Figure 9 to the fully extended position as seen on the left hand part of Figure 1.

It will be appreciated that the increased mechanical advantage and corresponding small movement of the gate 24 that are obtained at the extremes of the range movement of the toggle mechanism are accompanied by reduced mechanical advantage and relatively great movement at the intermediate stage of movement of the gate. Since the resistance to movement of the gates decreases after the initial breakaway stage, such reduction in mechanical advantage during this intermediate stage is not objectionable.

The toggle mechanism when in extended position, as shown in Figure 1, positively maintains the gate 24 in opened position and such retention is of importance in a railway car wherein the gate is longitudinally movable and subject to displacement under buffing shocks.

The closing operation of the gate 24 is a reversal of the opening operation, the toggle mechanism forcing the pair of gates 24 into tight meeting relation and operating to compress the resilient gaskets 52. In order to compensate for wear and irregularities in manufacture there are provided the threaded adjusting eyebolts 32 whereby limited variations in the setting of the gates 24 is readily effected.

The gate 24 in its transitory movement as heretofore pointed out is restrained against vertical displacement by reason of the guide plates 50 and consequently the full effect of the toggle linkage is exercised to move the gate upon rotation of the shaft 26.

As shown more clearly in Figures 10, 11 and 12 the upper section 18 of the frame structure 17 is formed by transverse end walls 54 and 55 which overlie the sloping walls 12 and 13, respectively, and by side walls 56 and 57 which overlie side walls 14 and 15, respectively.

What is claimed as new is:

1. A hopper discharge opening closure structure for use in a railroad car having a longitudinally extending center sill and having an opening providing for the downward discharge of lading by gravity and comprising, in combination, a rectangular frame having end walls and depending side walls, rail members parallel to and secured to said depending side walls and parallel to said center sill and extending inwardly of said side walls and uninterruptedly beyond said frame, gate means slidably mounted on said rail members throughout the entire extent of movement thereof and guided at least in part therealong by said side walls, inwardly sloping transverse walls underneath said end walls below said gate between and secured to said rail members and forming therewith a chute beneath said frame, and means for moving said gate means along said rail members between open and closed positions.

2. The invention, as set forth in claim 1, wherein the gate means in closed position has an end extending outwardly of the rectangular frame, and the means for moving the gate means includes shaft means journaled on said end thereof.

3. A hopper discharge opening closure structure for use in a railroad car having a longitudinally extending center sill and having an opening providing for the downward discharge of lading by gravity and comprising, in combination, a rectangular frame having end walls and depending side walls, flanged rail members extending parallel to said center sill and inwardly of said side walls and uninterruptedly beyond said frame with a flange of each parallel to and secured to the respective depending side wall, gate means slidably mounted on the upper surfaces of said rail members throughout the entire extent of movement thereof and guided at least in part therealong by said side walls, inwardly sloping transverse walls with horizontally projecting upper sides underneath said end walls below said gate between and secured to said flanges of said rail members and forming therewith a chute beneath said frame, and means for moving said gate means along said rail members between open and closed positions.

4. The invention, as set forth in claim 3, wherein the gate means in closed position has an end extending outwardly of the rectangular frame in the direction of opening movement, and the means for moving the gate means includes shaft means journaled on said end, and means for rotating said shaft in one direction or the other.

5. In a railway car having a longitudinally extending center sill and a hopper formed by side and end walls defining an opening for the downward discharge of lading by gravity comprising, in combination, a frame having end walls and depending side walls overlying and secured to the side and end hopper walls and defining an opening constituting a continuation of said hopper opening, a pair of rail members parallel to and secured to said side walls of said frame parallel to said center sill and extending inwardly of said side walls of said frame and uninterruptedly underneath and beyond at least one of said end walls of said frame, gate means slidably mounted on said rail members throughout the entire extent of movement thereof and guided at least in part by said side walls of said frame, inwardly sloping transverse walls underneath the frame end walls below said gate between and secured to said rail members and forming therewith a chute beneath said frame, and means for moving said gate means between open and closed positions.

6. The invention, as set forth in claim 5, wherein the gate means in closed position has an end extending outwardly beyond the one end wall of the frame, and the means for moving the gate means includes a shaft journaled on said end parallel to said one end wall and means reacting between said shaft and the frame.

7. In a railway car having a longitudinally extending center sill and a hopper formed by side and end walls defining an opening for the downward discharge of lading by gravity comprising, in combination, an upper section having side walls and end walls overlying and secured to the side and end hopper walls and defining an opening constituting a continuation of said hopper opening, a chute-like lower section having side walls and end walls, said side walls of said lower section being formed by a pair of rail members parallel to and secured to said side walls of said frame parallel to said center sill, each of said rail members having a depending flange and a flange extending inwardly of said side walls of said frame and uninterruptedly underneath and beyond at least one of said end walls of said frame, said end walls of said lower section extending transversely of said rail members and downwardly and inwardly and secured at their ends to said depending flanges of said rail members below said inwardly extending flanges thereof, gate means slidably mounted on said inwardly extending flanges of said rail members throughout the entire extent of movement of said gate means, and means for moving said gate means between open and closed positions.

References Cited in the file of this patent

UNITED STATES PATENTS

| | | |
|---|---|---|
| 494,351 | Thomas | Mar. 28, 1893 |
| 502,584 | Rettig | Aug. 1, 1893 |
| 609,816 | Kramer | Aug. 30, 1898 |
| 700,580 | Torrent | May 20, 1902 |
| 1,081,040 | Handy | Dec. 9, 1913 |
| 1,098,315 | Clasen | May 26, 1914 |
| 1,484,764 | Dodd | Feb. 26, 1924 |
| 1,755,077 | Schellentrager | Apr. 15, 1930 |
| 2,222,280 | Batho | Nov. 19, 1940 |
| 2,328,003 | Gardes | Aug. 31, 1943 |
| 2,386,702 | McBride | Oct. 9, 1945 |
| 2,717,093 | Mautner | Sept. 6, 1955 |